United States Patent
Foerch et al.

(10) Patent No.: US 9,707,940 B2
(45) Date of Patent: Jul. 18, 2017

(54) HYDRAULIC DEVICE OF A VEHICLE BRAKING SYSTEM

(71) Applicant: Robert Bosch GmbH, Stuttgart (DE)

(72) Inventors: Dirk Foerch, Neuenstadt/Stein (DE); Volker Edelmann, Buchen (DE); Julia Jeschke, Abstatt (DE); Michael Dinerman, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/924,509

(22) Filed: Oct. 27, 2015

(65) Prior Publication Data
US 2016/0121865 A1    May 5, 2016

(30) Foreign Application Priority Data

Nov. 5, 2014    (DE) ........................ 10 2014 222 573

(51) Int. Cl.
| | |
|---|---|
| *B60T 8/32* | (2006.01) |
| *B60T 7/04* | (2006.01) |
| *B60T 13/14* | (2006.01) |
| *B60T 13/66* | (2006.01) |
| *B60T 13/68* | (2006.01) |

(52) U.S. Cl.
CPC ............ *B60T 7/042* (2013.01); *B60T 13/146* (2013.01); *B60T 13/662* (2013.01); *B60T 13/686* (2013.01)

(58) Field of Classification Search
CPC ... B60T 8/36; B60T 8/38; B60T 8/306; B60T 8/341
USPC .... 303/3, 10, 11, 113.1–113.5, 116.1–116.2, 303/119.1, 119.2, 155, 901
See application file for complete search history.

(56) References Cited

U.S. PATENT DOCUMENTS

| | | | |
|---|---|---|---|
| 5,246,280 A * | 9/1993 | Sigl .......................... | B60T 8/341 303/113.2 |
| 2009/0184567 A1* | 7/2009 | Hinz ....................... | B60T 8/261 303/9.64 |

* cited by examiner

*Primary Examiner* — Christopher Schwartz
(74) *Attorney, Agent, or Firm* — Maginot, Moore & Beck LLP

(57) ABSTRACT

A hydraulic device of a vehicle braking system includes a storage reservoir configured to store brake fluid. The hydraulic device further includes a pump with a suction side configured to set a brake fluid pressure in at least one associated wheel brake. The hydraulic device also includes a line connection interposed between the storage reservoir and the suction side of the pump. In addition, the hydraulic device includes a high-pressure switching valve arranged in the line connection. The high-pressure switching valve is configured to possess an opening pressure of less than 1 bar. Further, the hydraulic device includes at least one brake circuit, and the at least one brake circuit includes the pump, the line connection, and the high-pressure switching valve.

10 Claims, 1 Drawing Sheet

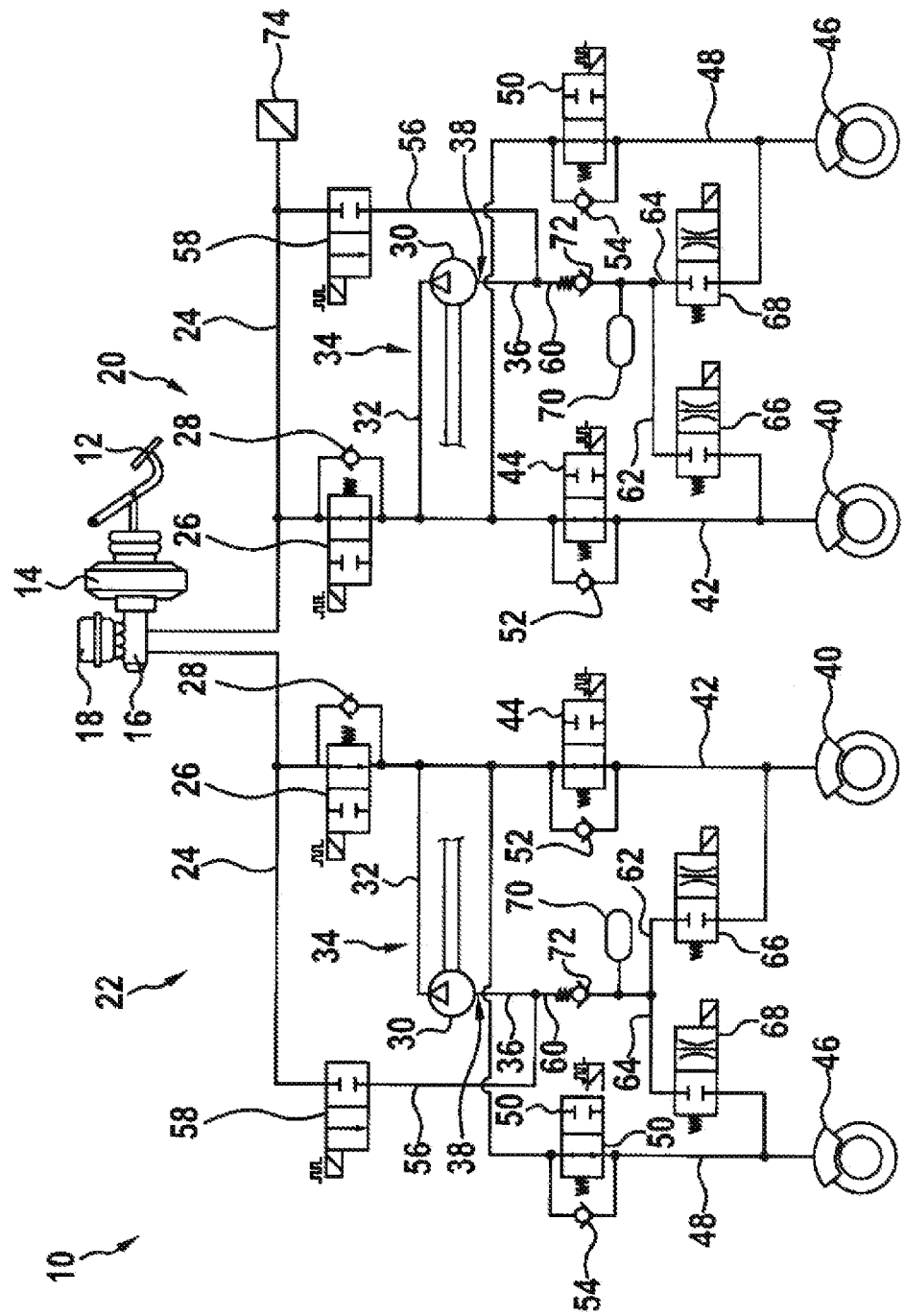

HYDRAULIC DEVICE OF A VEHICLE BRAKING SYSTEM

This application claims priority under 35 U.S.C. §119 to German patent application no. 10 2014 222 573.6, filed Nov. 5, 2014 in Germany, the disclosure of which is incorporated herein by reference in its entirety.

The disclosure concerns a hydraulic device of a vehicle braking system with at least one brake circuit which comprises a storage reservoir for storage of brake fluid and a pump with a suction side for setting a brake fluid pressure in at least one associated wheel brake, and with a line connection from the storage reservoir to the suction side of the pump in which a high-pressure switching valve is arranged. The disclosure furthermore concerns a method for operating a vehicle braking system with at least one brake circuit which comprises a storage reservoir for storage of brake fluid and a pump with a suction side for setting a brake fluid pressure in at least one associated wheel brake, and with a line connection from the storage reservoir to the suction side of the pump in which a high-pressure switching valve is arranged.

BACKGROUND

Generic vehicle braking systems reduce the speed of a vehicle, in particular a car or truck. For this a pedal-actuated brake master cylinder is provided, to which at least two brake circuits are connected. The two brake circuits each lead to two associated wheel brakes. When the driver actuates the brake pedal, a mechanical force thus exerted is converted into a hydraulic force which in turn causes an increase of the brake fluid pressure at the wheel brakes. In the known fashion, this pressure is additionally increased or reduced by means of a hydraulic assembly with which also functions of an antilock braking system (ABS) and/or electronic stability programme (ESP) can be implemented. For this, a plurality of pumps is provided in the hydraulic assembly, by means of which the brake fluid pressure in the individual brake line portions of the associated brake circuit is increased or reduced. The individual brake line portions are isolated by means of hydraulic valves which can usually be switched electromagnetically. One of these valves is placed in a line connection between the storage reservoir and the suction side of the associated pump, and is generally also called a suction valve or high-pressure switching valve (HSV). When the high-pressure switching valve is activated, it opens a flow path from the storage reservoir to the suction side of the pump, so that the pump can actively build up brake fluid pressure which can be passed on to the wheel brakes. To guarantee correct opening and closing of the high-pressure switching valve, this is provided with a valve body which is pressed or tensioned against an associated valve seat by means of a valve spring. The valve body can thus only be lifted actively from the valve seat by the application of force. The opening pressure generated by the valve spring is overcome by means of a solenoid assembly, by means of which the valve body can be moved on switching of the high-pressure switching valve. The opening pressure is normally over 2 bar. The opening pressure is the pressure which must be present at the valve body in order for this to be raised from the valve seat, even without activation by the solenoid assembly, against the force of the valve spring.

SUMMARY

According to the disclosure, a hydraulic device of a vehicle braking system with at least one brake circuit is created, which comprises a storage reservoir for storage of brake fluid and a pump with a suction side for setting a brake fluid pressure in at least one associated wheel brake, and with a line connection from the storage reservoir to the suction side of the pump in which a high-pressure switching valve is arranged. According to the disclosure, the high-pressure switching valve is designed with an opening pressure of less than 1 bar.

The solution according to the disclosure thus provides a targeted reduction of the opening pressure of a high-pressure switching valve of a vehicle braking system. Preferably, the high-pressure switching valve according to the disclosure is designed with an opening pressure of less than 0.5 bar. Particularly preferably, the opening pressure of the high-pressure switching valve is even almost close to 0 bar. The opening pressure is the hydraulic pressure or fluid pressure which must be present on the suction side of the associated pump at the high-pressure switching valve in order for its valve body to lift from the associated valve seat without external influence. In other words, the opening pressure is the pressure at which the high-pressure switching valve opens autonomously. The high-pressure switching valve according to the disclosure may thus carry a backflow at very low counter-pressure, preferably without counter-pressure.

The solution according to the disclosure is based on the knowledge that a high-pressure switching valve can advantageously be used to evacuate the suction side of a pump of a hydraulic assembly of a motor vehicle braking system. This evacuation is in principle already possible with known hydraulic assemblies by the high-pressure switching valve being switched to active or opened. The active switching opens the flow path from the suction side of the pump into the storage reservoir so that when a positive pressure is present at the suction side of the pump, this positive pressure can be dissipated in the direction towards the storage reservoir. This type of evacuation however requires active control, corresponding software algorithms and an associated data storage volume in the electronic control system. According to the disclosure however, automatic evacuation of the suction side of the pump is guaranteed even without electric control of the high-pressure switching valve. The solution according to the disclosure is not only economic and particularly simple structurally, but it is also particularly reliable in operation.

Particularly preferably, in the hydraulic device according to the disclosure, the high-pressure switching valve is formed by a valve body which comes to lie on a valve seat and is freely moveable without sprung pretension. In this refinement, the valve spring normally used in high-pressure switching valves is omitted, so that additional component costs and assembly costs can be saved.

In the hydraulic device according to the disclosure, furthermore in the known manner a pressure accumulator is provided which is coupled to the suction side of the pump. The pressure accumulator serves in particular for temporary storage of pressurized brake fluid which must be discharged rapidly from the associated wheel brakes in the case of braking with antilock brake control. Such a pressure accumulator can also be evacuated automatically with the solution according to the disclosure, particularly simply and reliably, during system rest phases in which no braking processes take place and accordingly ambient pressure predominates in the storage reservoir. The pressure accumulator according to the disclosure can here be evacuated down to a particularly low residual pressure of at least less than 1 bar, preferably less than 0.5 bar and particularly preferably almost 0 bar.

Furthermore, according to the disclosure, advantageously a non-return valve is provided in the hydraulic assembly according to the disclosure, which is arranged between the pressure accumulator and the suction side of the pump. In the operating case of braking by means of the brake master cylinder, the non-return valve ensures that the associated pressure accumulator is decoupled at the suction side of the pump and the brake pressure cannot flow out accordingly into the pressure accumulator. For the case of evacuation of the pressure accumulator, the non-return valve however allows brake fluid through, whereby the non-return valve is also advantageously designed with a low opening pressure, particularly advantageously less than 0.5 bar.

The solution according to the disclosure is also directed at a method for operating a vehicle braking system with at least one brake circuit which comprises a storage reservoir for storing brake fluid and a pump with a suction side for setting a brake fluid pressure in at least one associated wheel brake, and with a line connection from the storage reservoir to the suction side of the pump in which a high-pressure switching valve is arranged. For the automatic evacuation of the suction side of the pump according to the disclosure as explained above, the high-pressure switching valve is opened automatically at an opening pressure of less than 1 bar. Preferably the high-pressure switching valve is opened at an opening pressure of less than 0.5 bar. Particularly preferably, the high-pressure switching valve is opened at an opening pressure of almost 0 bar.

BRIEF DESCRIPTION OF THE DRAWING

An exemplary embodiment of the solution according to the disclosure is explained in more detail below with reference to the enclosed diagrammatic drawing.

The FIGURE shows the circuit diagram of a hydraulic vehicle braking system with a hydraulic device according to the disclosure.

DETAILED DESCRIPTION

The FIGURE illustrates a hydraulic vehicle braking system 10 which comprises a brake pedal 12 which can be actuated by a driver of an associated four-wheeled vehicle. The brake pedal 12 acts on a brake servo 14, by means of which pressure can be created on a brake fluid, in the present case a brake liquid, at an associated brake master cylinder 16 as the brake pressure generator. For this, the brake master cylinder 16 has a storage reservoir 18 for brake fluid and is connected to two brake circuits 20 and 22.

The brake circuit 20 comprises as a line connection a brake line 24, in which a switch-over valve or shut-off valve 26 is arranged for optional closure or connection of the brake circuit 20 to the brake master cylinder 16. In parallel to the shut-off valve 26, a non-return valve 28 is connected through which fluid can flow from the brake master cylinder 16.

Furthermore, the brake circuit 20 comprises a piston pump as a pump 30 which divides the brake line 24 into a brake line portion 32 downstream of the pump 30 in the flow direction, i.e. its pressure side 34, and a brake line portion 36 upstream of the pump 30 in the flow direction, i.e. its suction side 38.

At the pressure side 34, also called the high-pressure side, the brake line portion 32 divides such that a brake line portion 42 is provided between the pump 30 and a wheel brake 40, in which an inlet valve or brake pressure build-up valve 44 is arranged. In addition, a further brake line portion 48 with a further brake pressure build-up valve 50 is provided between the pump 30 and a further wheel brake 46. When the brake pressure build-up valve 44 is opened, a wheel brake pressure can be built up in a wheel brake cylinder of the wheel brake 40, and when the brake pressure build-up valve 50 is opened, the pressure is built up in a wheel brake cylinder of the wheel brake 46. Furthermore, a respective non-return valve 52 and 54, through which fluid can flow from the wheel brakes 40 and 46 to the brake master cylinder 16, is connected hydraulically in parallel to each of the two brake pressure build-up valves 44 and 50.

On the suction side 38, called the low-pressure side, the pump 30 is connected by the brake line portion 36 to a suction line portion 56 in which a suction valve or high-pressure switching valve 58 is arranged for optional intake of brake fluid from the brake master cylinder 16. The suction line portion 56 opens into the brake line portion 36, to which a return line portion 60 is connected which branches into two return line branches 62 and 64. Of these, the one return line branch 62 opens into the brake line portion 42 between the brake pressure build-up valve 44 and the wheel brake 40, and the other return line branch 64 opens into the brake line portion 48 between the brake pressure build-up valve 50 and the wheel brake 46. Furthermore, an outlet valve or brake pressure reduction valve 66 is arranged in the return line branch 62, and a brake pressure reduction valve 68 is arranged in the other return line branch 64.

With such brake pressure reduction valves 66 and 68, brake fluid can be returned from the associated wheel brakes 40 and 46, and hence the respective wheel brake pressure reduced.

For temporary storage of the return brake fluid, a pressure accumulator 70 is provided in the return line portion 60 in the form of a storage chamber. A spring-loaded non-return valve 72 opening against the pump 30 is also arranged between a connection of the pressure accumulator 70 and the pump 30.

With the brake pressure build-up valves 44 and 50 and the associated brake pressure reduction valves 60 and 68, a wheel brake pressure modulation valve arrangement is created with which the respective wheel brake pressure in the wheel brakes 40 and 46 can be regulated individually per wheel in the known manner. Also, a pressure sensor 74 for measuring the pressure in the brake fluid is arranged on the brake line 24.

The shut-off valve 26, the two brake pressure build-up valves 44 and 50, the high-pressure switching valve 58 and the two brake pressure reduction valves 66 and 68 are designed as 2/2-way magnetic valves. In the present case, the shut-off valve 26 and the two brake pressure build-up valves 44 and 50 are open in their unpowered base setting, with spring-actuated open position, and can be transferred into a blocked position by electromagnetic switching.

The two brake pressure reduction valves 66 and 68 are closed in their unpowered base setting, with spring-actuated blocking position, and can be transferred to an open position by electromagnetic switching.

The high-pressure switching valve 58 however is designed without springing and can therefore, in its unpowered base position, carry a brake fluid flow at almost 0 bar pressure from the suction side 38, with its brake line portion 36 and suction line portion 56, to the storage reservoir 18. On back flow of brake fluid from the brake line portions 36 and 56, brake fluid from the pressure accumulator 70 passes through the non-return valve 72 into the storage reservoir 18.

The pressure accumulator 70 can thus be evacuated virtually automatically or autonomously down to a particularly low fluid pressure during system rest phases even without actuation of the high-pressure switching valve 58. The high-pressure switching valve 58 is only closed in powered state.

The brake circuit 22 is largely similar in structure to the brake circuit 20. The brake circuit 22 also comprises a brake line 24, a non-sprung high-pressure switching valve 58, a suction line portion 56 and a pump 30. The pump 30 also has a suction side 38 with a brake line portion 36, and a pressure side 34 with a brake line portion 32, a shut-off valve or switching valve 26 and a non-return valve 28. Furthermore, the brake circuit 22 comprises pressure build-up valves or inlet valves 44, 50 and a non-return valve 52 or 54 connected in parallel thereto. The brake circuit 22 also comprises brake line portions 42 and 48 with wheel brakes 40 and 46, and brake pressure reduction valves or outlet valves 66 or 68. Return line branches 62 and 64 are also present, with a return line portion 60 and a pressure accumulator 70 in the form of an accumulator chamber, and a non-return valve 72.

The function elements correspond to those of the brake circuit 20 and are not therefore described in detail here.

The high-pressure switching valve 58 is also arranged in the brake line 24 of the brake circuit 22, by means of which the storage reservoir 18 can be isolated from the suction side 38 of the pump 30 there.

This high-pressure switching valve 58 of brake circuit 22 is also designed unsprung for optional automatic or autonomous evacuation of the suction side 38 and the pressure accumulator 70 connected thereto by the non-return valve 72, and only closed in powered state.

What is claimed is:

1. A hydraulic device of a vehicle braking system, comprising:
   a storage reservoir configured to store brake fluid;
   a pump with a suction side configured to set a brake fluid pressure in at least one associated wheel brake;
   a line connection interposed between the storage reservoir and the suction side of the pump; and
   a single valve arranged in the line connection, the single valve being a high-pressure switching valve configured to selectively isolate the storage reservoir from the suction side of the pump,
   wherein the high-pressure switching valve is configured to possess a backflow opening pressure of less than 1 bar.

2. The hydraulic device according to claim 1, wherein the high-pressure switching valve is configured to possess a backflow opening pressure of less than 0.5 bar.

3. The hydraulic device according to claim 2, wherein the high-pressure switching valve is configured to possess a backflow opening pressure of almost 0 bar.

4. The hydraulic device according to claim 3, wherein the high-pressure switching valve includes a valve body that is (i) configured to lie against a valve seat, and (ii) freely moveable without spring pretension.

5. The hydraulic device according to claim 1, further comprising a pressure accumulator that is coupled to the suction side of the pump.

6. The hydraulic device according to claim 5, further comprising a non-return valve arranged between the pressure accumulator and the suction side of the pump.

7. The hydraulic device of claim 1, wherein:
   the hydraulic device comprises at least one brake circuit, and
   the at least one brake circuit includes the pump, the line connection, and the high-pressure switching valve.

8. A method for operating a vehicle braking system with at least one brake circuit, comprising:
   storing a brake fluid in a storage reservoir;
   setting a brake fluid pressure in at least one associated wheel brake via a pump with a suction side; and
   opening a single valve arranged in a line connection from the storage reservoir to the suction side of the pump, the single valve being a high-pressure switching valve configured to selectively isolate the storage reservoir from the suction side of the pump,
   wherein the high-pressure switching valve is opened with a backflow opening pressure of less than 1 bar.

9. The method according to claim 8, wherein the high-pressure switching valve is opened with a backflow opening pressure of less than 0.5 bar.

10. The method according to claim 9, wherein the high-pressure switching valve is opened with a backflow opening pressure of almost 0 bar.

* * * * *